(12) United States Patent
Persson et al.

(10) Patent No.: US 8,467,390 B2
(45) Date of Patent: Jun. 18, 2013

(54) METHOD AND SYSTEM FOR NETWORK STACK TUNING

(75) Inventors: Anders D. Persson, San Mateo, CA (US); Cesar A. C. Marcondes, Los Angeles, CA (US); Darrin P. Johnson, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1182 days.

(21) Appl. No.: 11/638,858

(22) Filed: Dec. 14, 2006

(65) Prior Publication Data

US 2008/0144503 A1 Jun. 19, 2008

(51) Int. Cl.
*H04L 12/28* (2006.01)

(52) U.S. Cl.
USPC ............................ 370/392; 710/316; 379/242

(58) Field of Classification Search
USPC .. 370/218, 230, 235, 237, 252, 392; 709/250, 709/235, 224, 220, 227; 726/14
See application file for complete search history.

(56) References Cited

U.S. PATENT DOCUMENTS

| | | | |
|---|---|---|---|
| 7,912,926 B2* | 3/2011 | Belgaied et al. | 709/220 |
| 8,028,071 B1* | 9/2011 | Mahalingam et al. | 709/227 |
| 2004/0081201 A1* | 4/2004 | Simonnet et al. | 370/469 |
| 2004/0249933 A1* | 12/2004 | Govindarajan et al. | 709/224 |
| 2005/0091412 A1* | 4/2005 | Pinkerton et al. | 709/250 |
| 2007/0058528 A1* | 3/2007 | Massa et al. | 370/218 |
| 2010/0071055 A1* | 3/2010 | Kaniz et al. | 726/14 |

* cited by examiner

*Primary Examiner* — Dang Ton
*Assistant Examiner* — Lionel Preval
(74) *Attorney, Agent, or Firm* — Osha Liang LLP

(57) ABSTRACT

In general, the invention relates to a method for sending a packet from an application to a destination. The method includes opening a network connection between the application and the destination, tuning at least one layer in a network stack, based on application information associated with the application, to obtain a tuned network stack, wherein the network stack is associated with the network connection, receiving the packet from the application, processing the packet using the tuned network stack to obtain a processed packet, and sending the processed packet to the destination, wherein the processed packet is received by the destination.

16 Claims, 6 Drawing Sheets

METHOD AND SYSTEM FOR NETWORK STACK TUNING

CROSS-REFERENCE TO RELATED APPLICATIONS

Subject matter contained herein may be related to subject matter contained in copending U.S. Pat. Nos. 7,672,240, 7,701,856, 7,746,901, 8,149,826, 8,102,852, and 8,000,239 entitled: "Method and System for Using Bayesian Network Inference for Selection of Transport Protocol Algorithm"; "Method and System for Bi-level Congestion Control for Multipath Transport"; Method and System for Offloaded Transport Layer Protocol Switching"; "Method and System for Profiling and Learning Application Networking Behavior"; "Method and System for Timestamping Data Packets From a Network"; and "Method and System for Bandwidth Allocation Using Router Feedback", respectively, and filed on Dec. 14, 2006, in the names of the same inventors and having the same assignee as the present application.

BACKGROUND

In the last several years, the Internet has evolved towards widespread sharing of all forms of information. The ease of creating a public website has led to a culture of individual self-publishing and co-operative publishing in the form of blogs, podcasts, wikis, and photo and video sharing. Voice Over Internet Protocol (VoIP) services have allowed the expansion of the Internet's communication capabilities. Sophisticated on-demand content provisioning has enabled the delivery of all forms of media across the Internet, including traditional media forms such as newspapers, radio, television, and movies. Greater bandwidth has moved traditionally local file backups and mirrors to locations that are accessed over a network. In addition, the Internet's peer-to-peer infrastructure has given rise to real-time data transmission as well as file sharing.

These changes have led to increased heterogeneity of media types and traffic, increased network complexity, reduced latency requirements, and increased bandwidth requirements. Often, network traffic seamlessly transitions through multiple wireless Local Area Network (LAN) standards (e.g., 802.11a, 802.11b, 802.11g, 802.11n), wireless Personal Area Network (PAN) standards such as Bluetooth® (Bluetooth is a registered trademark of Bluetooth Sig, Inc. of Delaware), wired standards such as Ethernet, and even storage area networks (SANs) and any associated network storage protocols. Furthermore, network traffic itself is composed of many different types of data, which are sent using various packet transmission patterns and protocols. For example, streaming video traffic is transmitted using a different protocol from VoIP traffic. Additionally, network applications, from weather simulations and telemetry to streaming media and VoIP, are demanding increased bandwidth and reduced latency from the Internet.

To operate in a heterogeneous, complex environment and meet bandwidth and latency requirements, a network connection is customized to handle different traffic patterns, types of data transmitted, and types of transmission media. However, before customization takes place, the network connection is characterized appropriately. For example, multiple Transmission Control Protocol (TCP) congestion control algorithms exist, with each algorithm designed to handle a particular set of network conditions. However, to effectively use a particular TCP congestion control algorithm, the network conditions are first determined, and the appropriate congestion control algorithm is selected for the established network conditions. Mechanisms are also put in place to deal with changing network conditions, traffic patterns, and network usage once the TCP congestion control algorithm is implemented.

SUMMARY

In general, in one aspect, the invention relates to a method for sending a packet from an application to a destination. The method includes opening a network connection between the application and the destination, tuning at least one layer in a network stack, based on application information associated with the application, to obtain a tuned network stack, wherein the network stack is associated with the network connection, receiving the packet from the application, processing the packet using the tuned network stack to obtain a processed packet, and sending the processed packet to the destination, wherein the processed packet is received by the destination.

In general, in one aspect, the invention relates to a method for sending a packet from an application to a destination. The method includes opening a network connection between the application and the destination and tuning a network stack, based on application information associated with the application, to obtain a tuned network stack, wherein the network connection is associated with the network stack. Tuning the network stack includes tuning a physical layer of the network stack to obtain a tuned physical layer, tuning a network layer of the network stack based on the tuned physical layer to obtain a tuned network layer, and tuning a transport layer of the network stack based on the tuned network layer to obtain a tuned transport layer. The method further includes receiving the packet from the application, processing the packet using the tuned network stack to obtain processed packet, and sending the processed packet to the destination, wherein the processed packet is received by the destination.

In general, in one aspect, the invention relates to a system. The system includes an application, wherein the application is configured to issue a packet for a destination, a network stack operatively connected to the application, and a first network interface controller operatively connected to the network stack and a first network. The system is configured to open a network connection between the application and the destination, tune at least one layer in a network stack, based on application information associated with the application, to obtain a tuned network stack, wherein the network connection is associated with the network stack, receive the packet from the application, process the packet using the tuned network stack to obtain processed packet, and send the processed packet to the destination, wherein the processed packet is received by the destination.

Other aspects of the invention will be apparent from the following description and the appended claims.

DETAILED DESCRIPTION

Figure 1:
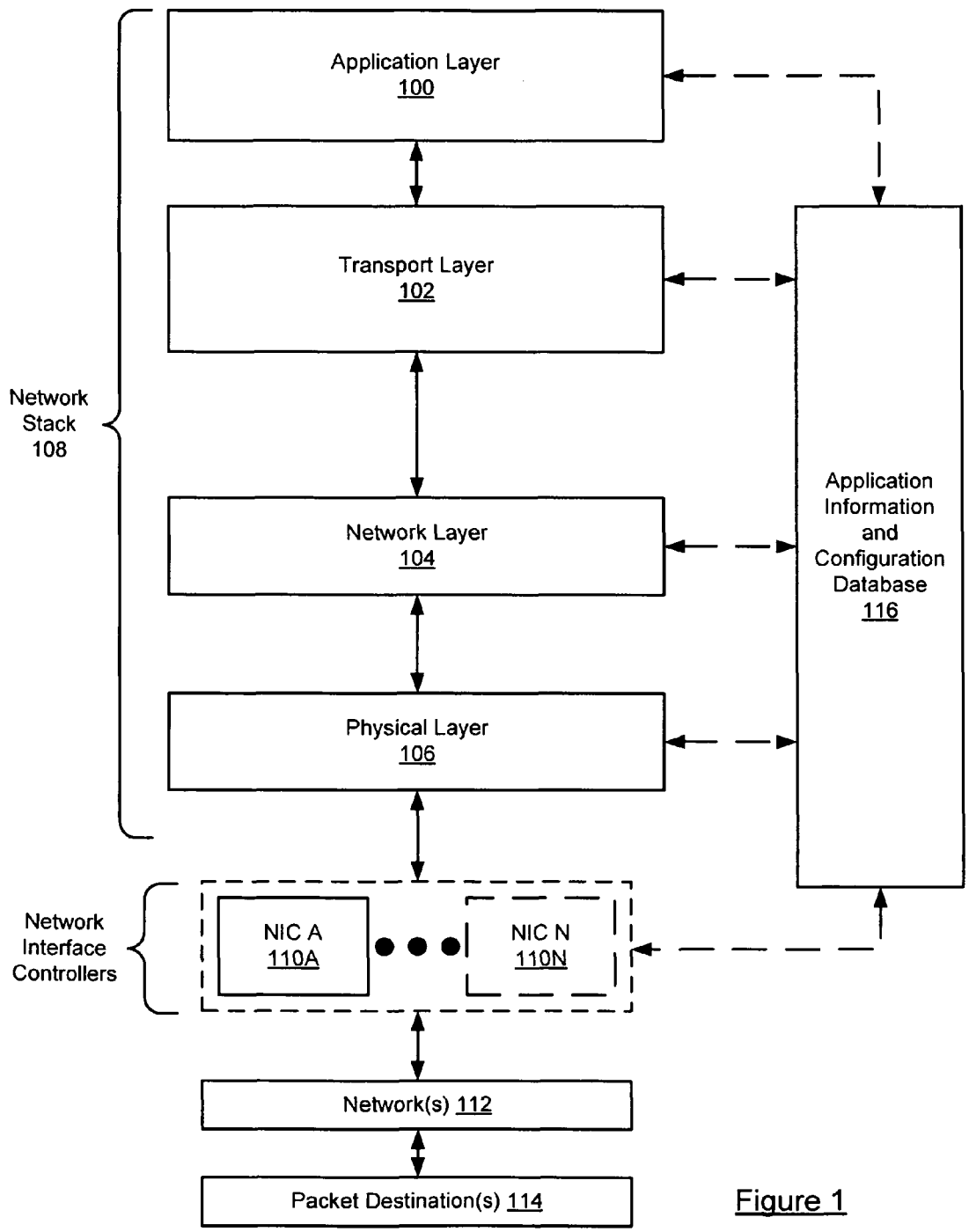
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for tuning a network stack for the communication of packets from an application to a destination. More specifically, embodiments of the invention relate to using application information associated with the application and operational information associated with one or more network interface controllers (NICs) operatively connected to the application, and/or information about network(s) interposed between the application and the destination to tune the network stack. In one embodiment of the invention, by tuning the network stack, packets are communicated between the application and the destination more efficiently and/or more reliably.

FIG. 1 shows a system in accordance with one embodiment of the invention. As shown in FIG. 1, the system includes a network stack (108) operatively connected to one or more Network Interface Controllers (NICs) (110A, 110N), an application information and configuration database (AICD) (116), one or more networks (112), and one or more packet destinations (114). Each of the aforementioned components is described below.

In one embodiment of the invention, the network stack (108) includes at least the following layers: an application layer (100), a transport layer (102), a network layer (104), and a physical layer (106).

In one embodiment of the invention, the network stack (108) corresponds to a software implementation of a computer networking protocol suite. In other words, the network stack (108) includes mechanisms in software for allowing communication between computer systems (e.g., between a system on which the application is executing and a system on which the packet destination is located). In one or more embodiments of the invention, computer systems are able to communicate with one another using packets sent across one or more networks (112), which include local area networks (LANs), wide area networks (WANs), campus area networks (CANs), metropolitan area networks (MANs), home area networks (HANs), ad hoc networks, wireless networks, or any combination thereof. Each network (112) is also associated with one or more protocols, which dictate how data is transferred between the computer systems.

In one or more embodiments of the invention, each layer (e.g., application layer (100), transport layer (102), network layer (104), physical layer (106)) of the network stack (100) is associated with one or more protocols to facilitate the transmission of information between the network stack (108) and the packet destination (114) over the network (112). In one or more embodiments of the invention, a packet destination (114) refers to a computer, or an application executing thereon, operatively connected to network stack (108) via one or more networks (112). In one or more embodiments of the invention, each protocol in the network stack (108) performs tasks for a specific layer of the network stack (108) and communicates with protocols in the layer above and the layer below. For example, a protocol in the network layer (104) may communicate with one or more protocols in the physical layer (106), as well as one or more protocols in the transport layer (102). In one or more embodiments of the invention, the network stack (108) is implemented using a set of protocols found in the Internet Protocol (IP) suite.

Within the network stack (108), the physical layer (106), in one embodiment of the invention, regulates the transmission of bits over one or more networks (112) between the network stack (108) and the packet destination (114). The bits may be transmitted over a variety of transmission media, including optical fiber, twisted pair cables, coaxial cables, and wireless antennae. In one or more embodiments of the invention, the physical layer (106) provides an electrical, mechanical, and/or procedural interface to the transmission media used by the network(s) (112). In one or more embodiments of the invention, the physical layer (106) is also associated with data link capability, which provides data transfer across a physical transmission medium. The physical layer (106) support one or more protocols including, but not limited to, Asynchronous Transfer Mode (ATM), Ethernet, Bluetooth®, Universal Serial Bus (USB), FireWire® (FireWire is a registered trademark of Apple Computer, Inc. of Cupertino, Calif., U.S.A.), and Wi-Fi.

In one embodiment of the invention, the network layer (104) is responsible for end-to-end transmission of data between the network stack (108) and a packet destination (114). In one or more embodiments of the invention, the network layer (104) provides functional and procedural mechanisms for transferring variable-length data sequences from the network stack (108) to a packet destination (114) via one or more networks (112). In one or more embodiments of the invention, the network layer (104) performs network routing, flow control, network segmentation and desegmentation, and/or error control functions. Protocols associated with the network layer (104) may include, but are not limited to, Internet Protocol (IP), Address Resolution Protocol (ARP), and Datagram Delivery Protocol (DDP).

In one embodiment of the invention, the transport layer (102) provides transparent transfer of data between the network stack (108) and a packet destination (114). The transport layer (102) may also be responsible for end-to-end error recovery, flow control, and ensuring complete and cost-effective data transfer. Services provided by the transport layer (102) may include creating a connection between the network stack (108) and a packet destination (114), guaranteeing same order delivery of packets, providing a checksum of packet contents, regulating packet flow between the network stack (108) and packet destination (114), and providing multiple ports on the network stack (108). In one or more embodiments of the invention, ports are used to distinguish between network traffic bound for various networking applications in the application layer (100). Protocols associated with the transport layer may include, but are not limited to, Transmission Control Protocol (TCP), User Datagram Protocol (UDP), Datagram Congestion Control Protocol (DCCP), and Stream Control Transmission Protocol (SCTP). In one embodiment of the invention, the transport layer (102) may also implement congestion control algorithms (discussed below).

In one embodiment of the invention, the application layer (100) provides services directly to applications (not shown) in the application layer (100). For example, the application layer (100) is used by an application associated with the network stack (108) to communicate with an application associated with a packet destination (114). The application layer (100) may also be used to format data received from the transport layer (102) into a form that is usable by an application. In one or more embodiments of the invention, the application layer (100) provides encryption of data before the data is sent through the network (112) to a packet destination (130). Protocols associated with the application layer may include, but are not limited to, HyperText Transfer Protocol (HTTP), File Transfer Protocol (FTP), Lightweight Directory Access Protocol (LDAP), and Simple Network Management Protocol (SNMP). In one or more embodiments of the invention, the application layer (100) includes one or more applications that communicate with one or more packet destinations (114) via one or more networks (112).

In one embodiment of the invention, the physical layer (106) is operatively connected to one or more network interface controllers (110A, 110N). In one embodiment of the invention, each NIC (110A, 110N) is a hardware device that provides network access to a computer system. Specifically, each NIC (110A, 110N) includes a network interface for receiving data packets from a network (112). Each NIC (110A, 110N) further includes logic for processing data packets and transferring data packets into system memory for use by applications in the system. The specific method by which data packets are transferred generally depends on the NIC hardware, the system's underlying architecture, which operating system is running on the system, and/or other similar factors.

In one embodiment of the invention, the NIC (110A, 110N) includes functionality of the NIC described in U.S. Pat. No. 8,102,852 entitled "Method and System for Timestamping Data Packets From a Network" filed on Dec. 14, 2006, in the names of the same inventors and having the same assignee as the present application, the entire contents of which are incorporated above in their entirety. In one embodiment of the invention, the NIC (110A, 110N) includes functionality of the NIC described in U.S. Pat. No. 7,746,901 entitled "Method and System for Offloaded Transport Layer Protocol Switching" filed on Dec. 14, 2006, in the names of the same inventors and having the same assignee as the present application, the entire contents of which are incorporated above in their entirety. Those skilled in the art will appreciate that a given NIC (110A, 110N) may include functionality described in both of the aforementioned applications.

Continuing with the discussion of FIG. 1, each NIC (110A, 110N) typically interfaces with the physical layer (106) using a device driver (not shown). Further, each NIC (110A, 110N) is operatively connected to a network (112). In one embodiment of the invention, each NIC (110A, 110N) is directly connected to a different network. For example, one NIC (110A, 110N) may be directly connected to wireless network while another NIC (110A, 110N) may be directly connected to a satellite network. (see Example described in FIG. 6 below).

In one embodiment of the invention, one or more layers in the network stack (108) and one or more NICs (110A, 110N) may be operatively connected to the AICD (116). In one embodiment of the invention, the AICD (116) corresponds to a data store configured to store at least the following information: application information associated with one or more applications and operational information associated with one or more NICs. In one embodiment of the invention, the AICD (116) may be implemented as a kernel-level database (or any functionally equivalent data storage mechanism) operatively connected to the network stack (108) or as a remote file (i.e., a file located on a system or a virtual system, which is remote to the system on which the network stack is located).

In one embodiment of the invention, application information includes, but is not limited to, a bandwidth requirement (e.g., maximum, maximum, and/or average required bandwidth), a number of packets issued by the application per time interval (e.g., packets/millisecond), an average size of an issued packet by the application, a latency requirement (e.g., the maximum, minimum and/or average amount of time the application will wait for the network stack to respond), a packet issuance profile of the application (e.g., intermittent issuance of network traffic, constant network traffic, constant network traffic with specific daily spikes in network traffic, etc.), application type (e.g., VoIP, FTP, etc.).

In one embodiment of the invention, the application information may be obtained by interrogating the application using a process associated with the AICD (116), using a process executing on a system on which the application is executing, and/or using a remote process with sufficient permissions to interrogate the application and forward results of the interrogation to the AICD (116). In one embodiment of the invention, application information may be obtained when the application is first installed. In one embodiment of the invention, additional application information may be obtained during execution of the application. The additional application information may be used to update and/or supplement the application information obtained during the installation of the application.

In one embodiment of the invention, the application information may also be obtained by monitoring the application using techniques and/or mechanisms described in U.S. Pat. Nos. 7,672,240 and 8,149,826 entitled "Method and System for Using Bayesian Network Inference for Selection of Transport Protocol Algorithm" and "Method and System for Profiling and Learning Application Networking Behavior", respectively, filed on Dec. 14, 2006, in the names of the same inventors and having the same assignee as the present application, the entire contents of which are incorporated above in their entirety. Those skilled in the art will appreciate that any combination of the aforementioned techniques and/or mechanisms may be used to obtain application information.

In one embodiment of the invention, the application may only provide the application type. In such cases, the AICD may use the application type to determine how to tune the network stack and/or collect other application information during the executing of the application and then tag the collected application information with the application type provided by the application. In this scenario, when another application with the same application type is installed, the AICD (116) (or a related process) may use the application type to locate application information tagged with the corresponding application type. In one embodiment of the invention, the AICD may be loaded with application information tagged with a corresponding application type obtained from a third party.

In one embodiment of the invention, operation information associated with a NIC may include, but is not limited to, a type of network to which the NIC is directly connected (e.g., wireless, wired, satellite, telephone, etc.), a maximum bandwidth of the NIC (e.g., 54 gbps), a maximum bandwidth of the network to which the NIC is directly connected (e.g., 10 gbps), network latency of the network to which the NIC is directly connected, whether the NIC supports local retransmission, and the packet drop rate of the network to which the NIC is directly connected.

In one embodiment of the invention, operational information may be obtained using a process associated with the AICD (116) and/or using a process executing on a system on which the NIC is operatively connected. In one embodiment of the invention, the operational information is obtained when the NIC is first installed on the system on which the network stack is operatively connected. Additional operational information may be obtained during use of the NIC. The additional operational information may be used to update and/or supplement the operational information obtained during the installation of the NIC.

In one embodiment of the invention, operational information associated with the NIC may be obtained during the operation of the NIC using or more techniques described in U.S. Pat. Nos. 8,102,852 and 8,000,239 entitled "Method and System for Timestamping Data Packets From a Network" and "Method and System for Bandwidth Allocation Using Router Feedback" filed on Dec. 14, 2006, in the names of the same inventors and having the same assignee as the present application, the entire contents of which are incorporated above in their entirety.

In one embodiment of the invention, the NIC may only provide the NIC type (e.g., manufacturer name, type of network the NIC is configured to interface with, and/or NIC model number). In such cases, the AICD may use the NIC type to determine how to tune the network stack and/or collect other operational information during use of the NIC and then tag the collected operational information with the NIC type provided by the NIC. In this scenario, when another NIC with the same NIC type is installed, the AICD (116) (or a related process) may use the NIC type to locate NIC information tagged with the corresponding NIC type. In one embodiment of the invention, the AICD may be loaded with operational information tagged with a corresponding NIC type obtained from a third party.

In one embodiment of the invention, the kernel (or a process associated therewith) executing on the system in which the network stack is located includes functionality to tune the network stack (108). Alternatively, the network stack (108) may be tuned by a remote process, which has access to the AICD and the necessary permissions to tune one or more layers of the network stack (108). In one embodiment of the invention, a combination of the kernel and a remote process may tune the network stack.

In one embodiment of the invention, functionality to tune the transport layer (102) includes, but is not limited to, functionality to: (i) select a transport layer protocol (e.g., TCP, UDP, Datagram Congestion Control Protocol (DCCP), Stream Control Transmission Control Protocol (STCP), Resource Reservation Protocol (RSVP), etc.); (ii) select a congestion control algorithm, and/or (iii) determine a size of a buffer to allocate. Those skilled in the art will appreciate that other parameters of the TCP layer (102) may be adjusted based on the information in the AICD. For example, the rate at which packets are placed in a buffer may be tuned using operational information related to the link speed and/or failure rate of a given network.

In one embodiment of the invention, the congestion control algorithms may include, but are not limited to: TCP Tahoe, TCP Reno, TCP Vegas, TCP NewReno, TCP Hybla, TCP Westwood, TCP Selective Acknowledgement Options (SACK), Hamilton TCP (HTCP), High-Speed TCP (HSTCP), Binary Increase Congestion (BIC) TCP, Cubic BIC (CUBIC) TCP, Fast Active Queue Management Scalable TCP (FAST), Scalable TCP (STCP), and Smart Acknowledgement (ACK) Dropper (SAD). In one embodiment of the invention, congestion control algorithms are not used in the transport layer or, alternatively, the use of congestion control algorithms in the transport layer is disable (permanently or temporarily).

In one or more embodiments of the invention, each buffer (not shown) is allocated based on the bandwidth and/or speed of the corresponding network used to communicate packets from the application to the packet destination. For example, a high-bandwidth, high-speed path may be allocated a larger buffer than a low-bandwidth, low-speed network.

In one embodiment of the invention, functionality to tune the network layer (104) includes, but is not limited to, functionality to select a network to use to communicate the packets from the application to the packet destination. The network is selected from the network(s) operatively connected to the network stack. Those skilled in the art will appreciate that other parameters of the network layer (104) may be adjusted based on the information in the AICD.

In one embodiment of the invention, if the network stack (108) is operatively connected to multiple networks (112), then there is a network-based IP routing table for each of the multiple networks (112). In one embodiment of the invention, each network-based IP routing table includes next hop IP destinations for the given network. Further, the appropriate network-based IP routing table is used in the network layer processing of the packets prior to sending the packets to the packet destination over the selected network (i.e., the one network selected from the plurality of networks).

In one embodiment of the invention, functionality to tune the physical layer (106) includes functionality to allocate virtual structures (e.g., virtual network interface controllers (VNICs)) in the physical layer. Additional discussion about VNICs may be found, for example, in U.S. Pat. No. 7,715,416 entitled: "Generalized Serialization Queue Framework for Protocol Processing" and U.S. Pat. No. 8,149,709 entitled: "Serialization Queue Framework for Transmitting Packets", both filed on Jun. 30, 2006, and having the same assignee as the present application, the entire contents of which are incorporated above in their entirety. Those skilled in the art will appreciate that other parameters of the physical layer (106) may be adjusted based on the information in the AICD.

In one embodiment of the invention, tuning one or more layers in the network stack is performed using static information in the AICD. For example, for all VoIP applications (or applications with similar application information) the network stack is tuned using a particular settings are each layer in the network stack, while the network stack is tuned in a different manner for all FTP applications (or applications with similar application information). In the aforementioned embodiment, the AICD may include a table (or other data structure), which includes preset network stack tuning configurations (i.e., how to tune each level of the network stack) for each type of application. Further, the AICD (or a related process) may include functionality to locate the appropriate network tuning configurations using application information and/or operational information.

Alternatively, the tuning of a network stack is performed using methods and/or techniques described in U.S. Pat. No. 7,672,240 entitled "Method and System for Using Bayesian Network Inference for Selection of Transport Protocol Algorithm".

Figure 2:
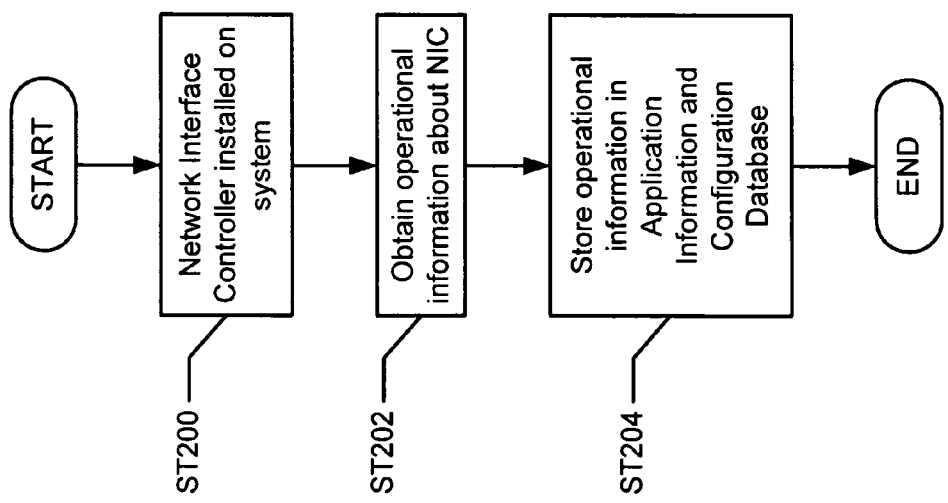

FIG. 2 shows a method for obtaining operational information from a Network Interface Controller (NIC) in accordance with one or more embodiments of the invention. In one or more embodiments, one or more of the steps shown in FIG. 2 may be omitted, repeated, and/or performed in a different order. Further, multiple steps may be performed concurrently. Accordingly, the specific arrangement of steps shown in FIG. 2 should not be construed as limiting the scope of the invention.

Initially, a NIC is installed on the system (ST200). In one embodiment of the invention, installing the NIC includes, but is not limited to, connecting the NIC to a network and loading a device driver associated with the NIC on the system. Once the NIC has been installed, operational information is obtained from the NIC using the techniques and/or mechanisms described above (ST202). The operational information obtained from the NIC is subsequently stored in the AICD (ST204).

Figure 3:
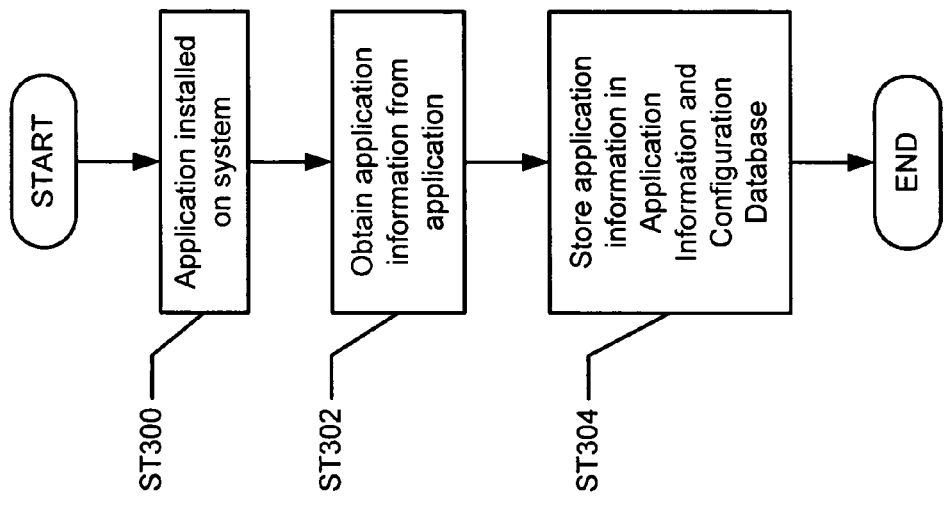
FIGS. 2-5 show flowcharts in accordance with one embodiment of the invention.

FIG. 3 shows a method for obtaining application information from an application in accordance with one or more embodiments of the invention. In one or more embodiments, one or more of the steps shown in FIG. 3 may be omitted, repeated, and/or performed in a different order. Further, multiple steps may be performed concurrently. Accordingly, the specific arrangement of steps shown in FIG. 3 should not be construed as limiting the scope of the invention.

Initially, the application is installed on the system (ST300). Installing the application on the system may include, but is not limited to, loading executable code (e.g., bytecode, binary, etc.) corresponding to the application on the system. The application information is subsequently obtained using the mechanisms and/or techniques described above (ST302). The application information is then stored in the AICD (ST304).

Figure 4:
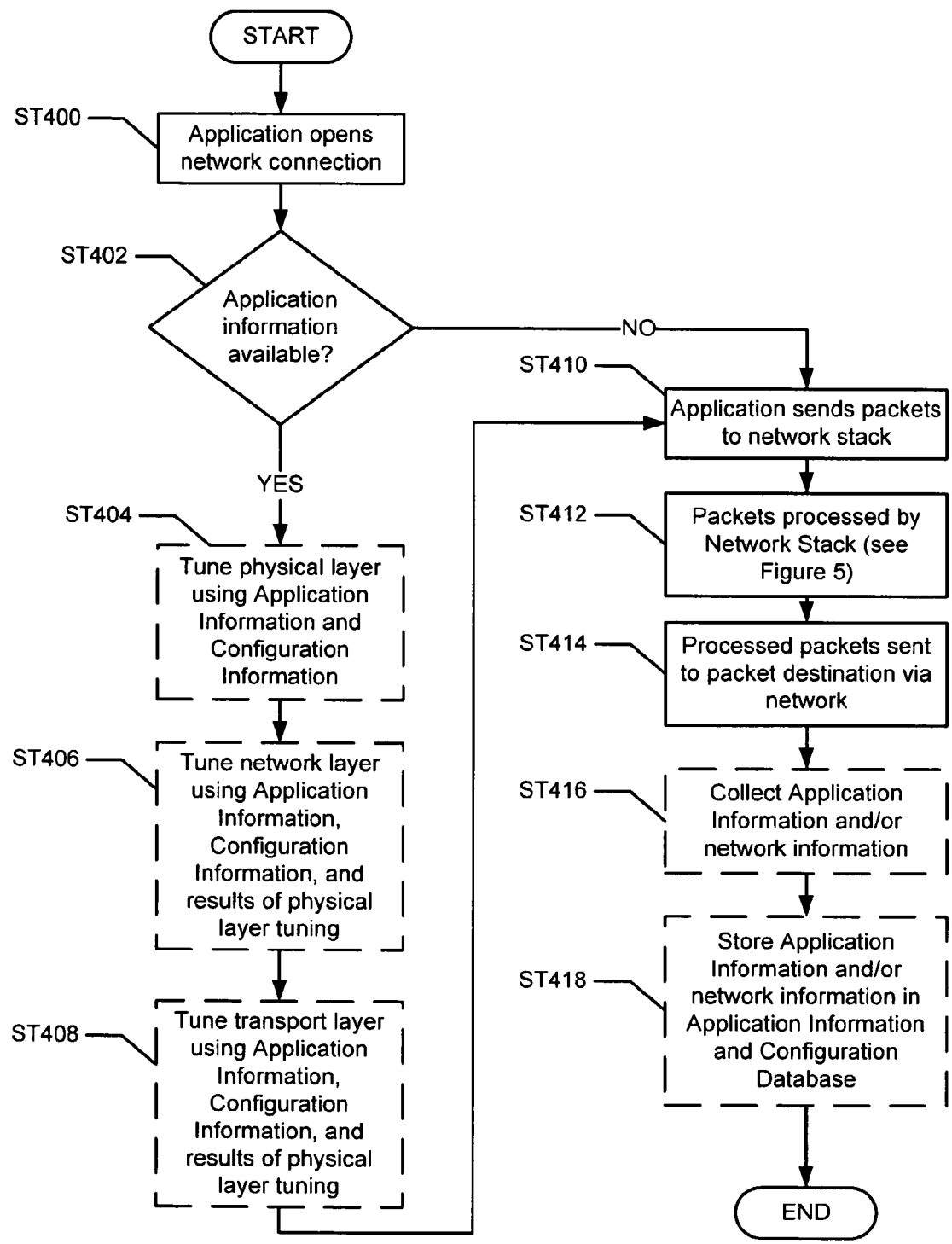

FIG. 4 shows a method for sending a packet from an application to a packet destination in accordance with one or more embodiments of the invention. In one or more embodiments, one or more of the steps shown in FIG. 4 may be omitted, repeated, and/or performed in a different order. Further, multiple steps may be performed concurrently. Accordingly, the specific arrangement of steps shown in FIG. 4 should not be construed as limiting the scope of the invention.

Initially, the application opens a network connection (ST400). In one embodiment of the invention, the network connection corresponds to a communication channel between the application and the packet destination. Once the network connection is opened, a determination is made about whether the AICD includes any application information associated with the application (ST402). In one embodiment of the invention, ST402 may also include determining whether application information was received from the application at the time the network connection was opened in ST400.

If application information is available, the kernel (or more specifically, a process executing therein) and/or a remote process (as described above) tunes one or more layers in the network stack in accordance with ST404, ST406, and ST408. Specifically, in ST404, the physical layer is tuned (as discussed above) using application information provided by the application and/or information (both operational information and application information) present in the AICD. Once the physical layer is tuned (or, if it is determined that the physical layer does not need to be (or cannot be) tuned (i.e., the default physical layer settings are used), the process may then proceed to ST406.

In ST406, the network layer is tuned using application information provided by the application and/or information (both operational information and application information) present in the AICD as well as results of the physical layer tuning. Once the network layer is tuned (or, if it is determined that the network layer does not need to be (or cannot be) tuned (i.e., the default network layer settings are used), the process may then proceed to ST408.

In ST408, the transport layer is tuned using application information provided by the application and/or information (both operational information and application information) present in the AICD as well as results of the network layer tuning. For example, if the application is a VoIP application, then during the network layer tuning a wired network may be selected to transmit the packets from the application to the packet destination. Using this information from the network layer tuning, the transport layer tuning may include the selection of the most appropriate congestion control algorithm to use with a wired network. Continuing with the discussion of FIG. 4, once the transport layer is tuned (or, if it is determined that the transport layer does not need to be (or cannot be) tuned (i.e., the default transport layer settings are used), the process then proceeds to ST410.

In ST410, the application sends the packets to the network stack. If any of ST404, ST406, and ST408 are performed prior to reaching ST410, then the network stack corresponds to a tuned network stack. Alternatively, if none of ST404, ST406, and ST408 are preformed prior to reaching ST410, then the network stack is not tuned; rather, the default network stack settings are used.

The packets are subsequently processed by the network stack (ST412). ST412 is discussed in further detail in FIG. 5 below. Continuing with FIG. 4, once the packets that are processed in the network stack, the packets are sent over the network to the packet destination (ST414). In one or more embodiments of the invention, additional application information and/or operational information may be obtained while the network connection is used to communicate packets between the application and the packet destination (ST416). If additional application information and/or operational information is obtained, it is stored in the AICD (ST418). As shown in FIG. 4, ST404, ST406, and ST408 and ST416, ST416, and ST418 are optional.

Figure 5:
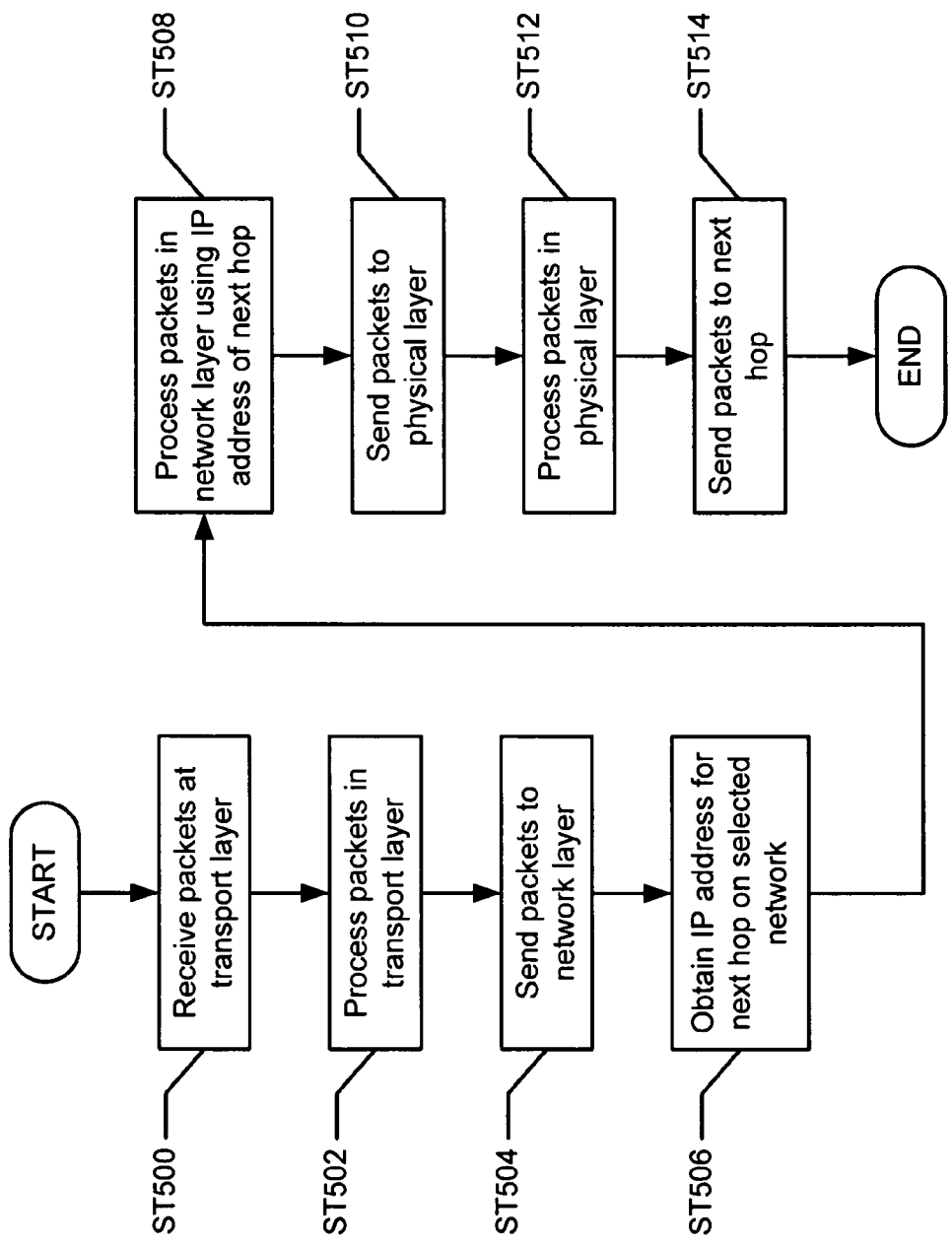

FIG. 5 shows a method for processing packets in a network stack in accordance with one or more embodiments of the invention. In one or more embodiments, one or more of the steps shown in FIG. 5 may be omitted, repeated, and/or performed in a different order. Further, multiple steps may be performed concurrently. Accordingly, the specific arrangement of steps shown in FIG. 5 should not be construed as limiting the scope of the invention.

Initially, the packets are received by the transport layer (ST500). The packets are subsequently processed by the transport layer (ST502). Processing by the transport layer may include, but is not limited to, allocating an appropriately sized buffer, applying the appropriate transport layer protocols, and/or applying the appropriate congestion control algorithms to the packets.

Once the packets have been processed by the transport layer, the packets are sent to the network layer (ST504). Upon receipt at the network layer, the network layer obtains the IP address of the next hop on selected network (ST506). More specifically, during the tuning of the network stack, one of the plurality of networks is selected to be used to communicate the packets from the application to the packet destination. Based on this selection, the network layer uses the appropriate routing table (e.g., a network-based routing table) to determine how to route the packets from the application to the packet destination. In one embodiment of the invention, the network layer determines the IP address of the network device (e.g., router, server, gateway, etc.) on the selected network that most closely matches the IP address associated with the packet destination (i.e., the destination address of the IP address for the next hop). Those skilled in the art will appreciate that if the IP address for the next hop matches the IP address of the packet destination, then the next hop is corresponds to the packet destination.

Continuing with the discussion of FIG. 5, once the IP address of the next hop is determined, the network layer processes the packets using the aforementioned IP address (ST508). After the network layer has completed processing the packets, the packets are sent to the physical layer (ST510). In ST512, the physical layer processes the packets. Processing the packets may include, but is not limited to, enforcing outbound bandwidth constraints using VNICs (as discussed above). Once the physical layer has completed processing the packets, the packets are sent over the network to the next hop (ST514). Eventually, the packets reach the packet destination.

Figure 6:
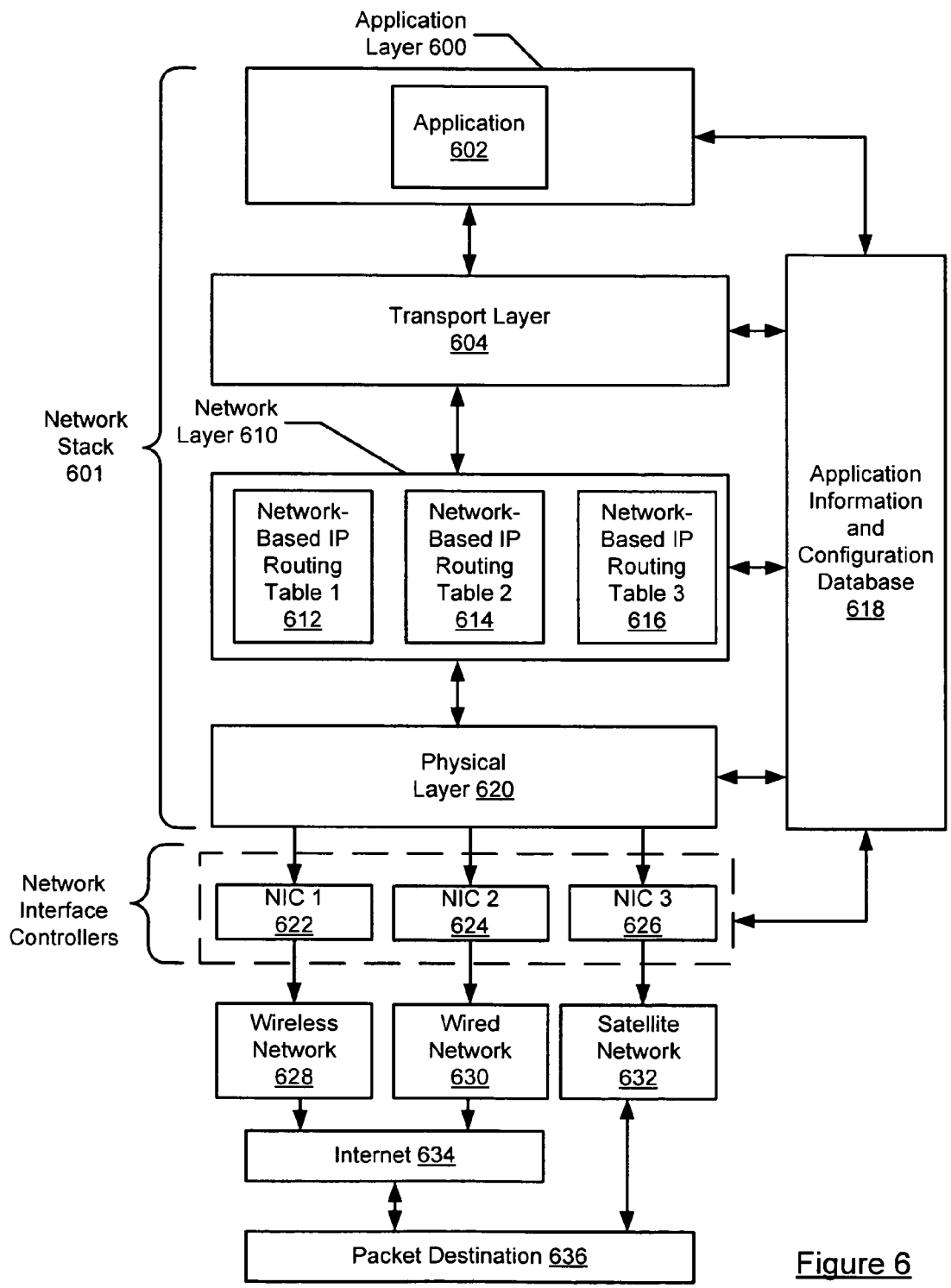
FIG. 6 shows an example in accordance with one embodiment of the invention.

FIG. 6 shows an example in accordance with one embodiment of the invention. Those skilled in the art will appreciate that the following example is provided for exemplary purposes only and accordingly should not be construed as limiting the scope of the invention in any way.

Turning to the example, the example shows an exemplary system in accordance with one or more embodiments of the invention. In particular, the system includes network stack (601), which includes an application layer (600), a transport layer (606), a network layer (610), a physical layer (620). Further, the network stack (601) is operatively connected to a number of network interface controllers (NICs) (622, 624, 626). Each of the NICs (622, 624, 626) is operatively connected to a different network (628, 630, 632). As shown in FIG. 6, each of the layers in the network stack (601) as well as the NICs (622, 624, 626) are operatively connected to the AICD (618).

For the purposes of this example, assume that the application (602) is a VoIP application and that the application only provides the application type (i.e., VoIP) to the AICD (618). Further, assume that the transport layer only supports UDP, TCP Reno, TCP NewReno, and FAST TCP.

In response to opening a connection between the application (602) and the packet destination (636), the kernel (or a related process) initiates the tuning of the network stack prior to the application (602) sending data to the packet destination (636). After querying the AICD (618), the kernel (or the related process) determines that the network stack (601) is operatively connected to three networks (628, 630, 632) and that the transport layer supports UDP, TCP (with no congestion control), TCP NewReno, and FAST TCP. Further, the kernel (or the related process) determines that the application is a VoIP application (based on received application type from the application). Using the aforementioned operational information and application information, the kernel (or the related process) determines that FAST TCP generally provides the lowest queuing delay of any of the supported transport layer protocol and that a wired network (630) is the most preferred network to use as it has the lowest delay fluctuation of any of the available networks (628, 630, 632).

Using the above information, the kernel (or the related process) uses the default physical layer settings, tunes the network layer to use Network-Based Routing IP Table 2 (614) to route packets to the packet destination (636), and tunes the transport layer to implement FAST TCP.

Once the network stack (601) is tuned, the application (602) is signaled to send packets to the transport layer (604). At the transport layer (604), the packets are processed using FAST TCP. The processes packets are then sent to the network layer (610). At the network layer (610), the IP address of the next hop in the wired network (630) is determined using Network Based-IP Routing Table 2 (614). The other two Network Based-IP Routing Tables (612, 616) are not used as they are not related to the wired network (630); rather, Network Based-IP Routing Table 1 (612) is associated with the wireless network (628) and Network Based-IP Routing Table 3 (616) is associated with the Satellite Network (632).

Once the packets are processed at the network layer (610), the packets are sent to the physical layer (620) for processing. After processing at the physical layer (620) is complete, the packets are sent to NIC 2 (624) (i.e., the NIC operatively connected to the wired network (630)). The packets eventual exit the wired network (630), enter the Internet (634), and, finally, exit the Internet (634) at the packet destination (636).

Those skilled in the art will appreciate that a single system may include multiple network stacks and that each of the network stacks may be individually tuned. Further, each of the aforementioned network stacks may be associated with the same AICD or each of the aforementioned network stacks may be associated with a different AICD. Alternatively, the system may include multiple AICDs where each AICD is associated with a subset of the network stacks. In one embodiment of the invention, embodiments of the invention may also be used with virtual network stacks. Additional discussion about virtual network stacks may be found, for example, in the following U.S. Pat. No. 7,885,257 entitled: "Multiple Virtual Network Stacks Instances Using Virtual Network Interface Cards" filed on Jun. 20, 2006, and having the same assignee as the present application, the entire contents of which are incorporated above in their entirety.

In one embodiment of the invention, if the invention is implemented using virtual network stacks then the AICD is accessible to each of the virtual network stacks. Alternatively, depending on the underlying system configuration, a single master copy of the AICD may be located in, for example, a global container or root domain (e.g., a XEN domain), and additional copies of the AICD may be spawned from the master copy of the AICD. Additional information about containers may be found, for example, in U.S. Pat. No. 7,885,257.

Figure 7:
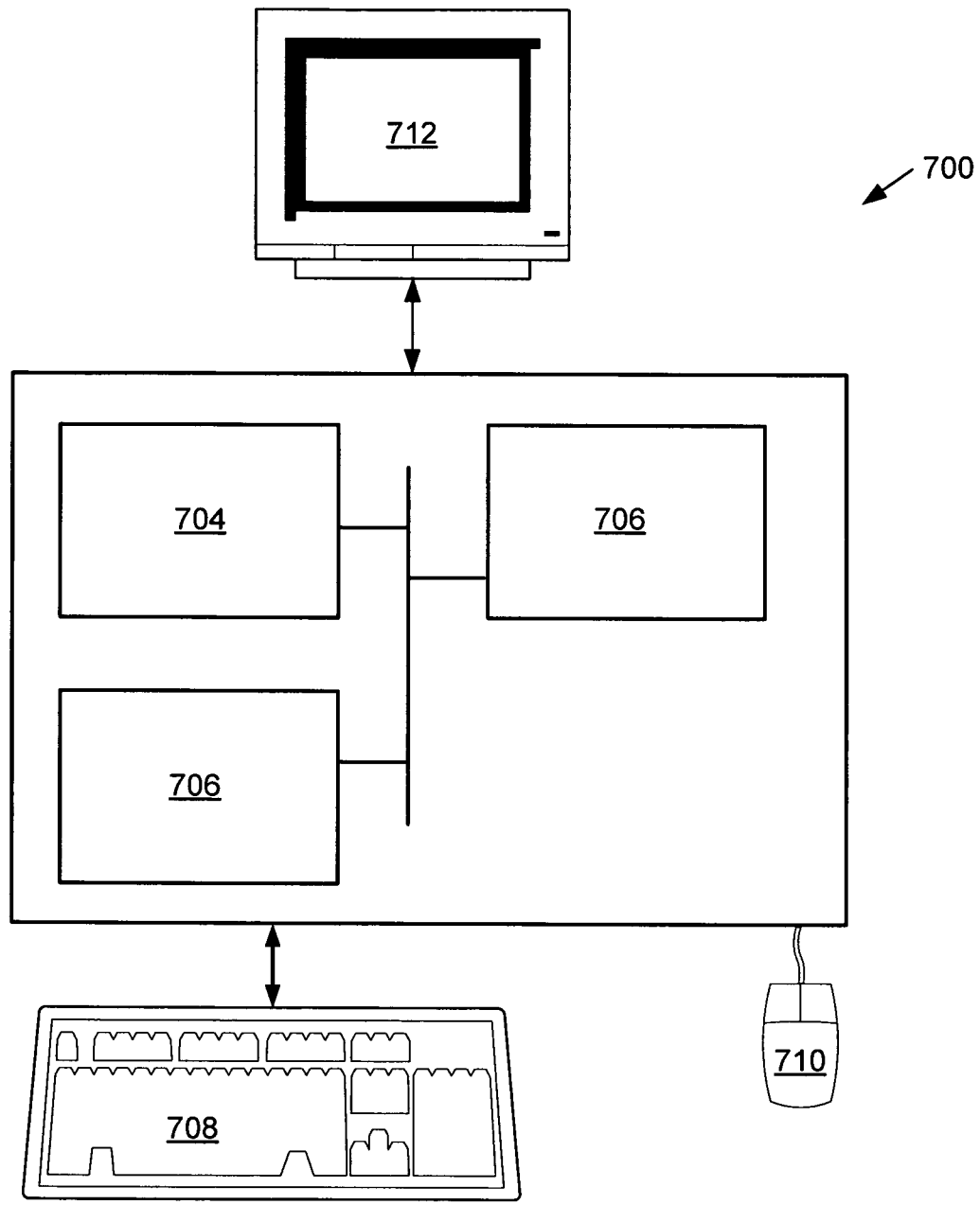
FIG. 7 shows a computer system in accordance with one embodiment of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sending a packet from an application to a destination, comprising:

opening a network connection between the application and the destination;

tuning at least one layer in a network stack located on a system, based on application information associated with the application, to obtain a tuned network stack, wherein the network stack is associated with the network connection, wherein the at least one layer in the network stack is tuned using a kernel executing on the system, wherein the kernel uses an application information and configuration database (AICD), and wherein the application information is stored in the AICD;

receiving the packet from the application;

processing the packet using the tuned network stack to obtain a processed packet; and sending the processed packet to the destination using a network interface controller (NIC), wherein the processed packet is received by the destination, wherein the at least one layer in the network stack is one selected from a group consisting of a network layer and a transport layer, wherein tuning the transport layer comprises at least one selected from a group consisting of selecting a transport layer protocol and selecting a congestion control algorithm, wherein tuning the network layer comprises selecting one network interface controller from a plurality of network interface controllers, wherein each of the plurality of network interface controllers is operatively connected to the network stack and wherein each plurality of network interface controllers is directly connected to a different one of a plurality of networks, and wherein each of the plurality of networks is interposed between the network stack and the destination, and wherein the AICD is populated using data from the application and the NIC.

2. The method of claim 1, wherein the network stack is tuned prior to receiving the packet from the application.

3. The method of claim 1, wherein tuning the at least one layer in the network stack further comprises tuning a physical layer.

4. The method of claim 1, wherein tuning the transport layer further comprises determining a size of a buffer to allocate.

5. The method of claim 1, wherein the transport layer protocol is one selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), HighSpeed TCP (HSTCP), Binary Increase Congestion (BIC) TCP, Cubic BIC (CUBIC) TCP, Fast Active Queue Management Scalable TCP (FAST), Scalable TCP (STCP), and Smart Acknowledgement (ACK) Dropper (SAD).

6. The method of claim 1, wherein the application information comprises at least one selected from a group consisting of a bandwidth requirement of the application, a number of packets issued by the application per time interval, an average size of a packet issued by the application, and a latency requirement of the application.

7. The method of claim 1, wherein processing the packet by the tuned network stack comprises:

processing the packet at the transport layer in the tuned network stack to obtain a transport layer processed packet;

receiving the transport layer processed packet at the network layer in the tuned network stack;

determining a destination internet protocol (IP) address, wherein the destination IP address is associated with a network device in a network, wherein the network is one of the plurality of networks interposed between the network stack and the destination, wherein each of the plurality of networks is operatively connected to the tuned network stack, and wherein the network is selected from the plurality of networks during the tuning of the network stack;

processing the transport layer processed packet using the destination IP address to obtain a network processed packet;

receiving the network processed packet at a physical layer in the tuned network stack; and processing the network processed packet at the physical layer to obtain the processed packet.

8. The method of claim 1, wherein tuning the network stack is further based on operational information associated with a network interface controller (NIC) associated with the network stack and wherein the operational information comprises at least one selected from a group consisting of a type of network to which the NIC is directly connected, a maximum bandwidth of the NIC, a maximum bandwidth of the network to which the NIC is directly connected, and whether the NIC supports local retransmission.

9. A method for sending a packet from an application to a destination, comprising:

opening a network connection between the application and the destination;

tuning a network stack located on a system, based on application information associated with the application, to obtain a tuned network stack, wherein the network connection is associated with the network stack, wherein the at least one layer in the network stack is tuned using a kernel executing on the system, wherein the kernel uses an application information and configuration database (AICD), and wherein the application information is stored in the AICD, and wherein tuning the network stack comprises:

tuning a physical layer of the network stack to obtain a tuned physical layer;

tuning a network layer of the network stack based on the tuned physical layer to obtain a tuned network layer, wherein tuning the network layer comprises selecting one network interface controller from a plurality of network interface controllers, wherein each of the plurality of network interface controllers is operatively connected to the network stack, wherein each plurality of network interface controllers is directly connected to a different one of a plurality of networks, and wherein each of the plurality of networks is interposed between the network stack and the destination, and tuning a transport layer of the network stack based on the tuned network layer to obtain a tuned transport layer, wherein tuning the transport layer comprises at least one selected from a group consisting of selecting a transport layer protocol and selecting a congestion control algorithm, receiving the packet from the application;

processing the packet using the tuned network stack to obtain processed packet; and sending the processed packet using a network interface controller (NIC) to the destination over a network selected during the tuning of the network stack, wherein the processed packet is received by the destination, wherein the AICD is populated using data from the application and the NIC.

10. The method of claim 9, wherein the network stack is tuned prior to receiving the packet from the application.

11. The method of claim 9, wherein tuning the transport layer further comprises determining a size of a buffer to allocate.

12. The method of claim 9, wherein the application information comprises at least one selected from a group consisting of a bandwidth requirement of the application, a number of packets issued by the application per time interval, an average size of a packet issued by the application, and a latency requirement of the application.

13. The method of claim 9, wherein processing the packet by the tuned network stack comprises:
processing the packet at the tuned transport layer in the tuned network stack to obtain a transport layer processed packet;
receiving the transport layer processed packet at the tuned network layer;
determining a destination internet protocol (IP) address, wherein the destination IP address is associated with a network device in the network, wherein the network is one of the plurality of networks interposed between the network stack and the destination, wherein each of the plurality of networks are operatively connected to the network stack, and wherein the network is selected from the plurality of networks;
processing the transport layer processed packet using the destination IP address to obtain a network processed packet;
receiving the network processed packet at a tuned physical layer; and
processing the network processed packet at the tuned physical layer to obtain the processed packet.

14. A system comprising:
an application, wherein the application is configured to issue a packet for a destination;
a network stack operatively connected to the application, wherein the network stack comprises a network layer and a transport layer;
an application information and configuration database (AICD) configured to be populated with application information obtained from the application and operational information obtained from the NIC;
a first network interface controller operatively connected to the network stack and a first network;
a second network interface controller operatively connected to the network stack and a second network,
wherein the system is configured to:
open a network connection between the application and the destination;
tune, prior to receiving the packet, at least one layer in the network stack, based on the application information associated with the application, to obtain a tuned network stack, wherein the network connection is associated with the network stack, wherein the at least one layer in the network stack is tuned using a kernel executing on the system, and wherein the kernel uses the AICD to tune the at least one layer in the network stack;
receive the packet from the application;
process the packet using the tuned network stack to obtain processed packet; and
send the processed packet to the destination, wherein the processed packet is received by the destination,
wherein processing the packet by the tuned network stack comprises:
processing the packet at the transport layer in the tuned network stack to obtain a transport layer processed packet;
receiving the transport layer processed packet at the network layer in the tuned network stack;
determining a destination internet protocol (IP) address, wherein the destination IP address is associated with a network device in a network, wherein the network is the network selected during the tuning, and one selected from the first network and the second network, wherein the first network and the second network are interposed between the network stack and the destination, and wherein the network is selected during the turning of the network stack;
processing the transport layer processed packet using the destination IP address to obtain a network processed packet;
receiving the network processed packet at the physical layer in the tuned network stack; and
processing the network processed packet at the physical layer to obtain the processed packet.

15. The method of claim 14, wherein the application information comprises at least one selected from a group consisting of a bandwidth requirement of the application, a number of packets issued by the application per time interval, an average size of a packet issued by the application, and a latency requirement of the application.

16. The system of claim 14, wherein tuning the transport layer comprises at least one selected from a group consisting of selecting a transport layer protocol, selecting a congestion control algorithm, and determining a size of a buffer to allocate, wherein the transport layer protocol is one selected from a group consisting of transmission control protocol (TCP) Tahoe, TCP Reno, TCP Vegas, TCP NewReno, TCP Hybla, TCP Westwood, TCP Selective Acknowledgement Options (SACK), Hamilton TCP (HTCP), HighSpeed TCP (HSTCP), Binary Increase Congestion (BIC) TCP, Cubic BIC (CUBIC) TCP, Fast Active Queue Management Scalable TCP (FAST), Scalable TCP (STCP), and Smart Acknowledgement (ACK) Dropper (SAD).

* * * * *